(12) United States Patent
Baehr-Jones et al.

(10) Patent No.: US 7,454,095 B2
(45) Date of Patent: Nov. 18, 2008

(54) INTEGRATED PLASMON AND DIELECTRIC WAVEGUIDES

(75) Inventors: Tom Baehr-Jones, Pasadena, CA (US); Michael J. Hochberg, Pasadena, CA (US); Axel Scherer, Laguna Beach, CA (US)

(73) Assignee: California Institute of Technology, Pasadena, CA (US)

( * ) Notice: Subject to any disclaimer, the term of this patent is extended or adjusted under 35 U.S.C. 154(b) by 68 days.

(21) Appl. No.: 11/116,110

(22) Filed: Apr. 26, 2005

(65) Prior Publication Data

US 2005/0249451 A1 Nov. 10, 2005

Related U.S. Application Data

(60) Provisional application No. 60/565,974, filed on Apr. 27, 2004.

(51) Int. Cl.
G02B 6/12 (2006.01)
G02B 6/26 (2006.01)

(52) U.S. Cl. .............................. 385/14; 385/40; 385/50

(58) Field of Classification Search ................... 385/40, 385/50, 14
See application file for complete search history.

(56) References Cited

U.S. PATENT DOCUMENTS

| | | | | |
|---|---|---|---|---|
| 4,604,520 A | 8/1986 | Pohl | ............................ | 250/216 |
| 5,272,330 A | 12/1993 | Betzig et al. | ................. | 250/216 |
| 5,389,779 A | 2/1995 | Betzig et al. | ................. | 250/216 |
| 5,410,151 A | 4/1995 | Buckland | ............... | 250/227.26 |
| 5,664,036 A | 9/1997 | Islam | ........................... | 385/31 |
| 5,789,742 A | 8/1998 | Wolf | ..................... | 250/227.11 |
| 5,894,122 A | 4/1999 | Tomita | ........................ | 250/234 |
| 5,914,218 A | 6/1999 | Smith et al. | ................. | 430/320 |
| 5,960,147 A | 9/1999 | Muramatsu et al. | ......... | 385/123 |
| 5,994,691 A | 11/1999 | Konada | ....................... | 250/234 |
| 6,194,711 B1 | 2/2001 | Tomita | ....................... | 250/234 |
| 6,668,628 B2 | 12/2003 | Hantschel et al. | ............. | 73/105 |
| 6,734,425 B2 | 5/2004 | Hantschel et al. | ........... | 250/306 |
| 6,866,255 B2 | 3/2005 | Fork et al. | ................. | 267/37.1 |
| 6,949,732 B2 | 9/2005 | Kiguchi et al. | .............. | 250/216 |
| 7,010,183 B2 * | 3/2006 | Estes et al. | ..................... | 385/14 |
| 7,015,584 B2 | 3/2006 | Chow et al. | ................. | 257/773 |
| 7,027,689 B2 * | 4/2006 | Blumberg et al. | ............. | 385/39 |
| 2002/0104959 A1 | 8/2002 | Arsenault et al. | ....... | 250/227.11 |
| 2003/0206708 A1 | 11/2003 | Estes et al. | ................... | 385/130 |

OTHER PUBLICATIONS

Almeida, V., et al., "Nanotaper for compact mode conversion", *Optics Letters* 28, pp. 1302-1304 (2003).
Baehr-Jones, T., et al., "A distributed implementation of the finite-difference time domain (FDTD), method", *Applied Computational Electromagnetics Society* (2001).
Baehr-Jones, T., et al., "High-Q ring resonators in thin silsicone-on-insulator", *Applied Physics Letters* 85 (2004).
Barnes, W.L., et al., "Surface plasmon subwavelength optics" *Nature*, vol. 424, (Aug. 14, 2003).

(Continued)

*Primary Examiner*—Sung Pak
*Assistant Examiner*—Jerry T Rahll
(74) *Attorney, Agent, or Firm*—Steinfl & Bruno

(57) ABSTRACT

A metal waveguide is coupled to a dielectric waveguide to obtain transmission of light in a plasmon mode along an edge of the metal waveguide. Efficient, broadband light transmission is obtained, achieving a low insertion loss, using standard processing tools. An efficient integrated optical circuit is obtained.

25 Claims, 6 Drawing Sheets

OTHER PUBLICATIONS

Henschel, W., et al., "Study of a high contrast process for hydrogen slisesquioxane as a negative tone electron beam resist", *Journal of Vacuum Science & Technology B: Microelectronics and Nanometer Structures 21*, pp. 2018-2025 (2003).

Hochberg, M., et al., *Opt. Express* 12, pp. 5481-5486 (Nov. 2004).

Maier, S. A., et al., "Local Detection of electromagnetic energy transport below the diffraction limit in metal nanoparticel plasmon waveguides", *Nature Materials* 2, pp. 229-232 (2003).

Nikolajsen, T., et al., "Poymer -based surface-plasmon-polariton stripe waveguides at telecommunication wavelengths", *Applied Physics Letters*, vol. 82, No. 5 (Feb. 3, 2003).

Rangelow, I. W., et al., "Reactive ion etching for microelectrical mechanical system fabrication", *Journal of Vacuum Science & Technology B: Microelectronics and Nanometer Structures* 13 pp. 2394-2399 (1995).

Taillaert, W., et al., "An Out of Planar Waveguided and Single-Mode Fibers", IEEE *Journal of Quantum Electronics* 38, 949 (2002).

Takahara, J., et al., "Guiding of a one-dimensional optical beam with a nano-meter diameter", *Optical Letters* 22, pp. 475-477 (1997).

Vukovic, J., et al., "Surfce Plasmon enhanced light emitting diode", *IEEE Journal of Qauntum Electronics* 36, pp. 1131-1144 (2000).

* cited by examiner

INTEGRATED PLASMON AND DIELECTRIC WAVEGUIDES

CROSS-REFERENCE TO RELATED APPLICATIONS

This application claims the benefit of U.S. provisional Patent Application Ser. No. 60/565,974, filed Apr. 27, 2004 for "Plasmon-Based Low Loss Waveguide Geometries and Structures for Light Manipulation" by Tom Baehr-Jones and Michael J. Hochberg, the disclosure of which is incorporated herein by reference. This application is filed on the same day of U.S. patent application Ser. No. 11/116,111, for "Near Field Scanning Microscope Probe and Method for Fabricating Same", also incorporated herein by reference in its entirety.

STATEMENT REGARDING FEDERALLY SPONSORED RESEARCH OR DEVELOPMENT

The present invention was supported in part by a grant from the Air Force Office of Scientific Research (AFOSR contract FA9550-04-1-0413). The U.S. Government may have rights in any patent issuing on this application.

BACKGROUND

1. Field

The present disclosure relates to integrated plasmon and dielectric waveguides.

2. Related Art

Future integrated photonic circuits for telecommunications and optical logic applications will require a high level of complexity. Plasmon waveguides, which are constructed out of metal, can be used to guide light in volumes far beneath the diffraction limit, offering a possible avenue towards dramatically increased device densities in integrated photonic circuits. See, for example, Takahara, J., Suguru, Y., Hiroaki, T., Morimoto, A., & Kobayashi, T., Guiding of a one-dimensional optical beam with nanometer diameter, Optics Letters 22, 475-477 (1997). A plasmon waveguide is a metal waveguide which allows conversion of the optical mode into non-radiating or only weakly radiating surface plasmons. A surface plasmon is an oscillation of free electrons that propagates along the surface of the metal. See also N. W. Ashcroft, N. D. Mermin "Solid State Physics" Brooks Cole (1976), Chapter 1, pages 19 and 27.

Compact plasmon waveguides generally suffer from high loss, and chip-scale integration presents a challenge, as does efficient coupling off-chip. See, for example, Barnes, W. L., Dereux, A., Ebbesen, T. W. Surface Plasmon Subwavelength Optics. Nature 424, 824-830 (2003).

The electromagnetic response of metals in the infrared and visible spectrum is characterized by a largely imaginary index of refraction enabling the definition of waveguides with sub-diffraction scale optical propagation. See Palik, E., Handbook of Optical Constants of Solids (Academic Press, Washington, D.C., 1985). There is a basic trade-off in all plasmon waveguide geometries between mode size and propagation loss. One can have a low propagation loss at the expense of a large mode size, such as in Nikolajsen, T., Leosson, K., Salakhutdinov, I., & Bozhevolnyi, S., Polymer-based surface-plasmon-polariton stripe waveguides at telecommunication wavelengths, Applied Physics Letters 82, 668-670 (2003), where propagation losses of 6 dB/cm for 20 nm slabs of gold, but with a 12 µnm mode diameter are reported. At the other extreme, in Takahara, J., Suguru, Y., Hiroaki, T., Morimoto, A., & Kobayashi, T., Guiding of a one-dimensional optical beam with nanometer diameter, Optics Letters 22, 475-477 (1997), guiding in 20 nm diameter silver nanowires, with a mode field diameter of about 10 nm, is predicted, but with theoretical propagation losses of 3 dB/410 nm. Though this loss is acceptable for nanoscale photonic circuitry, large scale integration with such losses is not feasible.

While efficient end-fire coupling from fiber modes to large scale plasmon waveguides has been demonstrated in Nikolajsen, a realistic path to large scale integration and off-chip coupling for nanoscale plasmon geometries has not yet been demonstrated. As a result, many of the current measurements that have been made for sub-diffraction scale plasmon optics have been done with direct interrogation methods, such as on-chip fluorescence as shown in Maier, S. A., Kik, P. G., Atwater, H. A., Meltzer, S., Harel, E., Koel, B. E., & Requicha, A. A., Local detection of electromagnetic energy transport below the diffraction limit in metal nanoparticle plasmon waveguides, Nature Materials 2, 229-232 (2003).

Plasmon based-waveguides are not the only way by which light can be guided on small scales. In particular, the applicants have previously demonstrated dielectric ridge waveguides of Silicon in Silicon-On-Insulator (SOI), which have low propagation loss of 6-7 dB/cm. See Baehr-Jones, T., Hochberg, M., Walker, C., & Scherer, A., High-Q ring resonators in thin silicon-on-insulator, Applied Physics Letters 85, (2004). Though the mode size is fundamentally diffraction limited, 90% of the optical energy is contained in a 1.5 square micron region, in such waveguides as we detail below.

Due to the low loss achievable, SOI waveguides are a promising path for chip-scale device integration. Perhaps as importantly, numerous geometries for the efficient, broadband coupling from an external fiber to an SOI waveguide have been demonstrated. See, for example, Taillaert, W. Bogaerts, P. Bienstman, T. F. Krauss, P. Van Daele, S. I. Moerman, Verstuyft, K. De Mesel, & R. Baets, An Out-of-Plane Grating Coupler for Efficient Butt-Coupling Between Compact Planar Waveguides and Single-Mode Fibers, IEEE J. Quantum Electron. 38, 949 (2002), or Almeida, V., Panepucci, R., & Lipson, M., Nanotaper for compact mode conversion, Optics Letters 28, 1302-1304 (2003).

SUMMARY

In the present disclosure, an apparatus and a method where both dielectric (e.g., SOI) waveguides and plasmon waveguides coexist, will be shown.

In accordance with the present disclosure, a material platform in which both plasmon waveguides and dielectric waveguides can be closely integrated is shown. The applicants demonstrate efficient, broadband light transmission between a silicon waveguide and a plasmon waveguide, achieving 3.4 dB of insertion loss, using standard processing tools that are widely available in the semiconductor industry. The results obtained by the applicants suggest a material system in which both plasmon and dielectric waveguides can be used together in practical integrated optical circuits.

According to a first aspect, an optical circuit is disclosed, comprising: a metal waveguide; and a dielectric waveguide associated with the metal waveguide, wherein light from the dielectric waveguide is adapted to be guided in a plasmon mode along an edge of the plasmon waveguide.

According to a second aspect, an optical coupling arrangement is disclosed, comprising: a first dielectric waveguide; a metal waveguide optically coupled to the first dielectric waveguide; and a second dielectric waveguide optically coupled to the metal waveguide, wherein light from the first dielectric waveguide to the second dielectric waveguide is adapted to be guided in a plasmon mode along an edge of the metal waveguide.

According to a third aspect, a process of fabricating an optical circuit is provided, comprising: providing a metal waveguide; providing a dielectric waveguide; and coupling the metal waveguide with the dielectric waveguide, to allow light in the dielectric waveguide to be guided in a plasmon mode along an edge of the plasmon waveguide.

Three-dimensional Finite-Difference Time Domain (FDTD) models on a distributed cluster of 45 personal computers (see also Baehr-Jones, T., Hochberg, M., & Scherer, A., A Distributed Implementation of the Finite-Difference Time Domain (FDTD) Method, Applied Computational Electromagnetics Society, 2001) were used to design plasmon waveguides by implementing the Drude model to simulate the interaction of the optical field with the metal. Reference can also be made to Vuckovic, J., Loncar, M., & Scherer, A., Surface plasmon enhanced light-emitting diode, IEEE Journal of Quantum Electronics 36, 1131-1144 (2000). A spatial discretization of 10 nm was used, with a time discretization 90% of the stability limit. See also Taflove, A., Computational Electromagnetics, (Artech House, Boston, 1995). The modes of a plasmon waveguide formed on the edge of a 100 nm thick layer of silver were solved by spatial filtering, and the waveguide loss was predicted to be roughly −0.4 dB/μm for wavelengths between 1.4 and 1.6 μm. The silver slab was located on top of a silicon dioxide layer of 1.4 μm thickness, which was in turn supported by a silicon handle. 90% of its optical energy of the plasmon mode is contained in a region of about 1 square micron region at the edge of the silver slab. The entire geometry is preferably clad in polymethylmethacrylate (PMMA), which is known to exhibit low optical losses in the near infrared regime (see, for example, Maier et al, cited above). The properties of silicon waveguides formed by a 0.5 μm ridge waveguide with 0.12 μm thickness in such a system were also studied.

Figure 1:
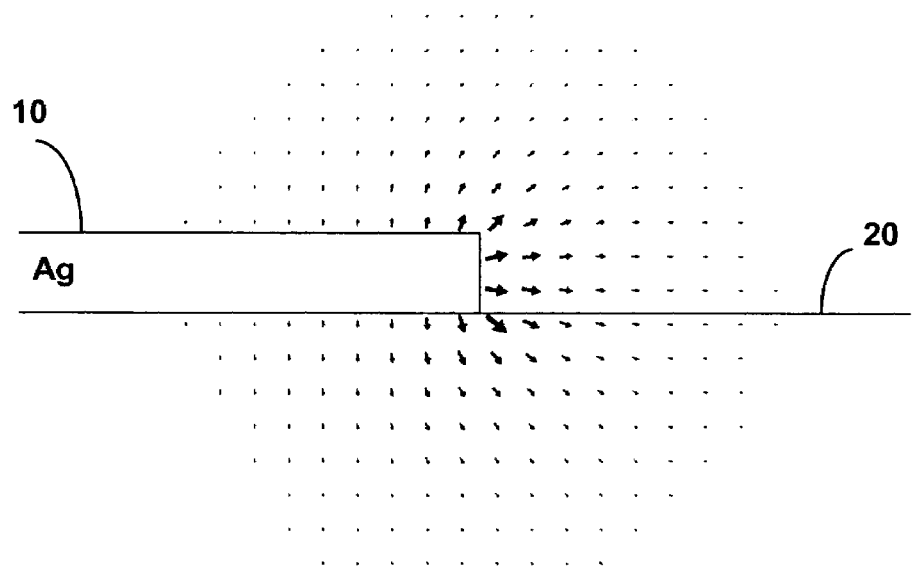
FIG. 1 shows a plasmon mode primarily polarized with the E field parallel to a chip surface.

FIG. 1 shows a plasmon mode primarily polarized with the E field parallel to the chip surface. In particular, FIG. 1 shows a plasmon waveguide 10 (e.g. a silver waveguide) on a substrate 20 (e.g. a silicon dioxide substrate). The person skilled in the art will understand that other materials can be used for the metal waveguide, such as silver, platinum, gold or alloys thereof. The thickness of the waveguide 10 can be from about 50 nm to about 1000 nm, preferably 100 nm. According to the present disclosure, light is guided in a plasmon-based mode along an edge of the waveguide, exhibiting the mode structure shown in the Figure.

Figure 2:
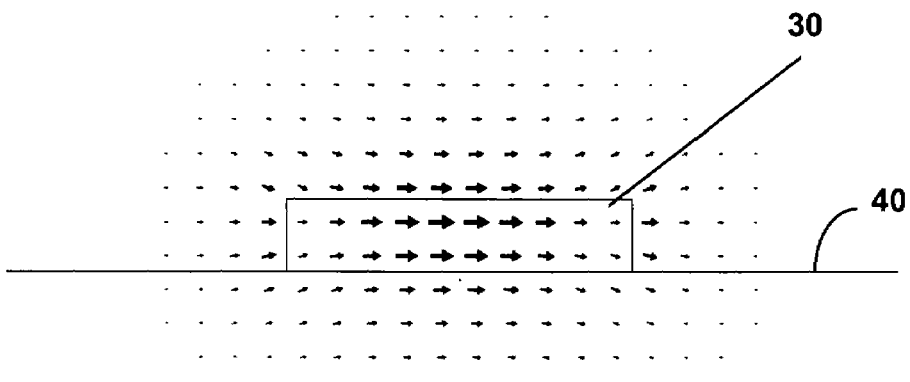
FIG. 2 shows a dielectric mode primarily polarized with the E field parallel to the chip surface.

FIG. 2 shows a dielectric mode primarily polarized with the E field parallel to the chip surface. In particular, FIG. 2 shows dielectric waveguide 30 (e.g. a silicon waveguide) on a substrate 40 (e.g. a silicon dioxide substrate).

Figure 3:
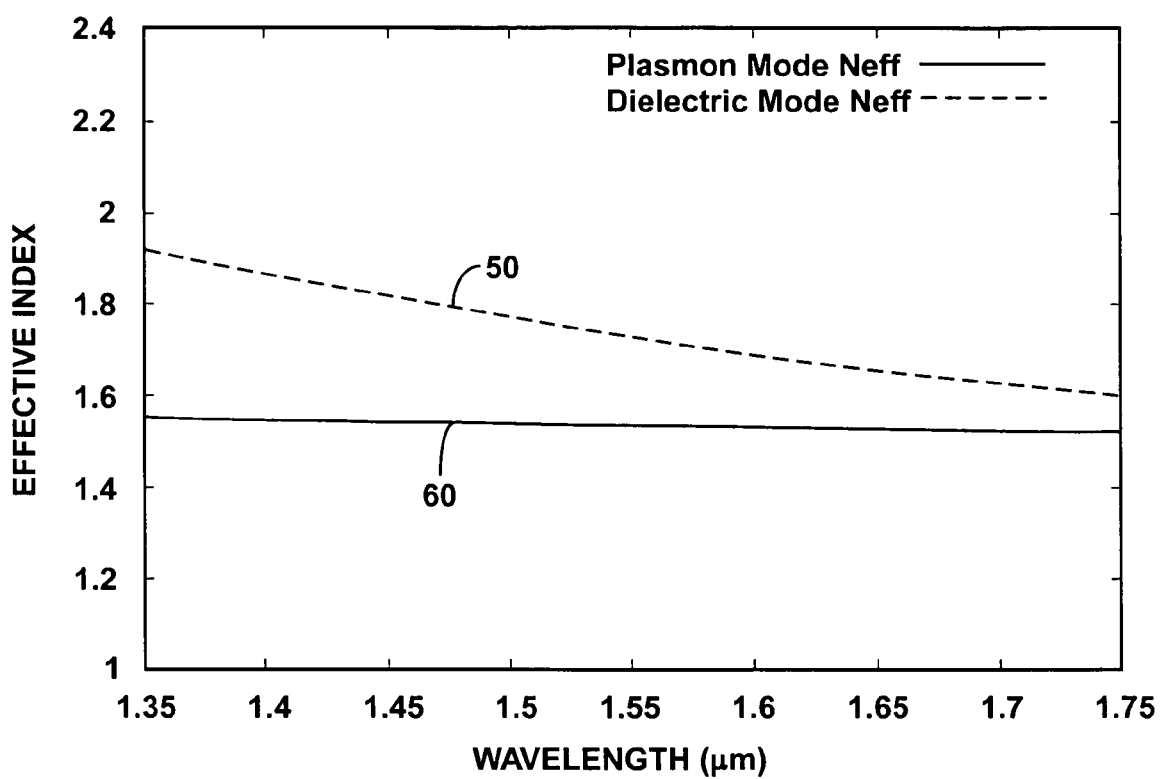
FIG. 3 shows a dispersion diagram for the modes of FIGS. 1 and 2.

FIG. 3 shows a dispersion diagram for both modes. The dispersion diagram represents the effective index of the modes of the plasmon and dielectric waveguides. In other words, the dispersion diagram describes the speed of light in each waveguide geometry as a function of wavelength. The top waveform 50 is the dispersion diagram for the plasmon mode. The bottom waveform 60 is the dispersion diagram for the dielectric mode.

To construct optical circuits, SOI wafers were obtained with an approximately 120 nm thick top silicon layer and a 1.4 micron buried oxide layer. Dow Corning's HSQ resist (see Henschel, W., Geirgiev, Y. M., & Kurz, H., Study of a high contrast process for hydrogen slisesquioxane as a negative tone electron beam resist, Journal of Vacuum Science & Technology B: Microelectronics and Nanometer Structures 21, 2018-2025 (2003)) was spun onto the chip, baked at 170° C., and silicon waveguides were exposed at 100 kV in a commercial electron beam lithography system at 3500 μC/cm$^2$. After development, pattern transfer was performed using a chlorine ICP plasma. See Rangelow, I. W., & Loschner, H., Reactive ion etching for microelectrical mechanical system fabrication, Journal of Vacuum Science & Technology B: Microelectronics and Nanometer Structures 13, 2394-2399 (1995). For the metal layer, PMMA resist was again spun onto the surface of the chip, and 100 nm of silver was evaporated followed by a metal liftoff. Finally, a thick layer of PMMA was spun onto the completed sample and baked—this layer served both as a water diffusion barrier in order to protect the silver from oxidizing and as a cladding layer for the waveguides. Alternatively, the circuit can be clad in silicon dioxide or air.

Efficient coupling between plasmon and SOI waveguides was achieved by directional coupling. Alternatively, butt coupling can be used. Preferably, the coupling length ranges between 1 μm and 2 μm. FDTD simulations predicted that a coupling length of 1.8 μm with a 150 nm separation between the plasmon and silicon waveguides resulted in broadband coupling efficiencies with a peak value of 2.4 dB at 1520 nm.

Figure 4:
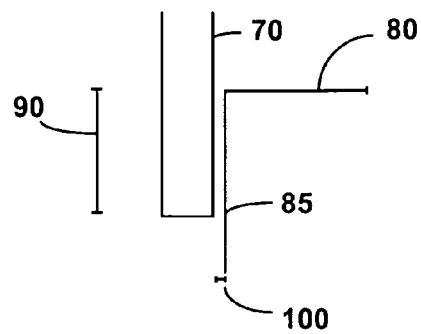
FIG. 4 shows a top view of an embodiment of the circuit according to the present disclosure.

FIG. 4 shows a top view of an embodiment of the circuit of the present disclosure, where a dielectric waveguide 70 is coupled with a plasmon waveguide 80, only partially shown. Segment 90 shows the coupling length, while segment 100 shows the separation between the two waveguides. The coupling length 90 can vary, for example, from about 500 nm to 50 μm. The separation 100 can vary, for example, from 20 mm to 5 μm. According to the present disclosure, light from the dielectric waveguide 70 propagates in a plasmon mode along an edge 85 of the waveguide 80. The behavior of the optical circuit in accordance with the present disclosure is rather different from previous propagation modes, where the propagating plasmon modes are either hopping between isolated metal dots, distributed energy on either side of a metal strip or exist on the large surface of a slab without being confined to an edge. The applicants have been able to obtain plasmon modes along an edge of a metal waveguide by way of a coupling to a dielectric waveguide by controlling the following parameters:

1) size of the dielectric waveguide (for example, 0.5 μm wide and 0.11 μm tall)
2) size of the metal waveguide (for example, 0.12 μm tall and rather large in lateral dimension, for example >2 μm)
3) Distance (see separation 100 in FIG. 4) between the dielectric waveguide and the metal waveguide (for example 0.2 μm)
4) Coupling length (see length 90 in FIG. 4), for example between 1 μm and 2 μm
5) Indices of refraction (for example, coupling a metal having a 0.5+11j complex index of refraction with silicon having an index of 3.4 or silicon dioxide having an index of 1.46)
6) Type of metal (for example, silver).

The person skilled in the art will understand, upon reading of the present disclosure, that the above disclosed values and/or combination of values are just exemplary and that other values and/or combinations of values are possible so long as plasmon modes on the edge of the metal waveguide are obtained.

Figure 5:
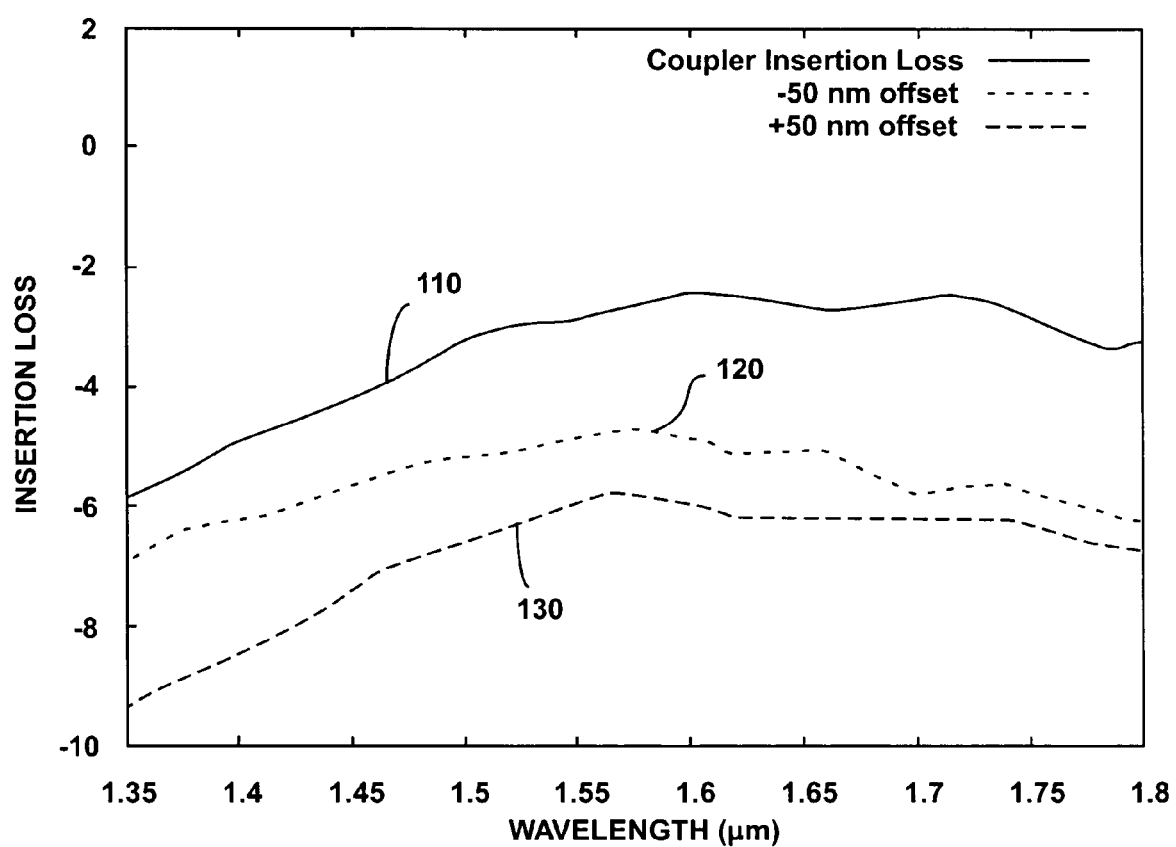
FIG. 5 shows the insertion loss as a function of wavelength for the circuit of FIG. 4.

FIG. 5 shows the insertion loss as a function of wavelength for the circuit of FIG. 4. In particular, FIG. 5 shows the behavior of three different devices, with variations in the separation (see element 100 of FIG. 4) between devices. It should be noted that the coupling efficiency suffers greatly from small perturbations in the spacing between the silicon and plasmon waveguides, with FDTD predicted falloffs on the order of 3 dB for 50 nm of offset. FIG. 5 shows the misaligned efficiencies. Because of the high sensitivity to edge misalignment, the multi-layer fabrication was performed with a zebra mask by using repeated devices with intentional misalignments of ±50 nm in both Cartesian axes. In particular, the top waveform 110 of FIG. 5 shows the simulated coupler insertion loss in dB vs wavelength in μm without misalignment for a nominal separation of 100 nm, the middle waveform 120 of FIG. 5 shows the coupler insertion loss with a −50 nm offset (i.e. separation of 50 nm), and the bottom waveform 130 of FIG. 5 shows the coupler insertion loss with a +50 nm offset (i.e. separation of 150 nm).

The first type of device that was fabricated consisted of straight plasmon waveguide lengths of varying plasmon propagation lengths, ranging from 1 to 1000 μm, preferably 2 to 12 μm. An automated, computer controlled optical alignment system was developed for this testing. Light was coupled into and out of the SOI waveguides from a polarization maintaining fiber array employing standard coupling geometries, such as those disclosed in the above mentioned Taillaert et al paper. An input laser was swept in wavelength at −3 dBm laser power to characterize each device, in increments of 0.01 nm. The applicants were able to effectively measure the device responses for free-space wavelengths from 1.5 to 1.53 μm, a bandwidth range that nearly encompasses a fiber-optic telecommunications band. Baseline calibration loops, which consisted of simple SOI waveguide loops with no plasmon devices, were used to measure the base insertion loss of the test setup and fiber to SOI waveguide coupler performance.

The frequency response of the devices was fairly flat in the 1.5-1.53 μm regime. Taking the peak transmission in the 1.51 μm to 1.52 μm spectral region for the best 5 devices of about 150 devices fabricated for each length, the applicants performed a linear regression to identify the coupling insertion loss, and propagation loss of the plasmon waveguide. These values were found to be 4.2±1.6 dB and 1.3±0.4 dB/μm respectively. The best device measured demonstrated 3.4±0.4 dB of coupling insertion loss. The coupling efficiency measured is in agreement with the predicted value from FDTD, while the propagation loss was clearly higher in the plasmon waveguide; this is most likely a result of fabricated imperfections in the silver slab edge.

Figure 6:
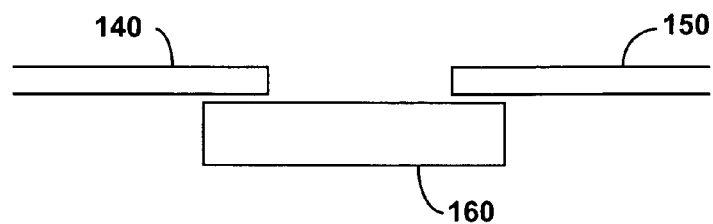
FIG. 6 shows a cross sectional view of the coupling between silicon waveguides and a plasmon waveguide.

FIG. 6 shows a cross sectional view of a straight waveguide coupling between a first silicon waveguide 140, a second silicon waveguide 150 and a plasmon waveguide 160.

Figure 7:
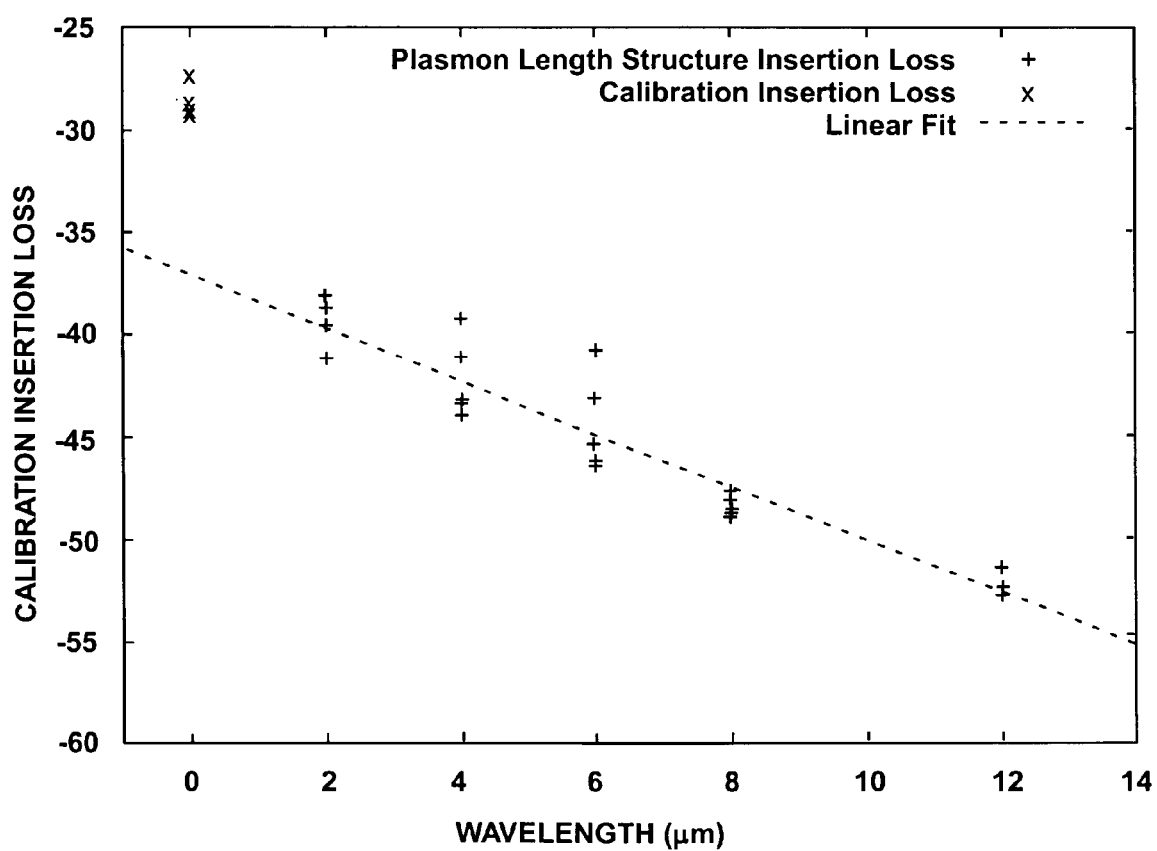
FIG. 7 shows s diagram representing fiber-to-fiber insertion loss versus plasmon waveguide length of the circuit of FIG. 6.

FIG. 7 shows the scatter plot and fitted line, as well as a scatter plot of the 5 best calibration insertion loss structures for contrast. The axes are fiber to fiber insertion loss in dB versus plasmon waveguide length in μm. The error scatter in the data is not quite Gaussian, likely due to our use of a zebra mask strategy to deal with misalignments between the lithography layers. In particular, FIG. 7 shows that there is a linear loss per micron in the plasmon waveguides, thus indicating that waveguiding is occurring in the metal.

The applicants also wanted to confirm that plasmon guiding was actually occurring, as opposed to free space coupling between the silicon waveguides. Curved plasmon waveguide devices were fabricated, which utilize tight plasmon waveguiding to achieve small bend radii. These devices were fabricated with the plasmon-dielectric couplers detailed above, and with bend radii of less than 0.10 μm, preferably 0.5 μm.

Figure 8:
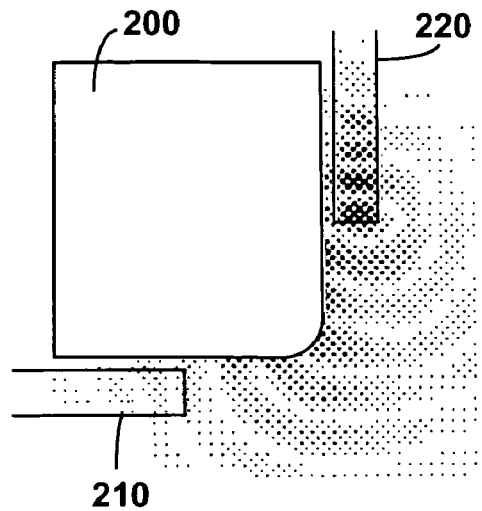
FIG. 8 shows a plasmon bend device coupling dielectric waveguides.
Figure 9:
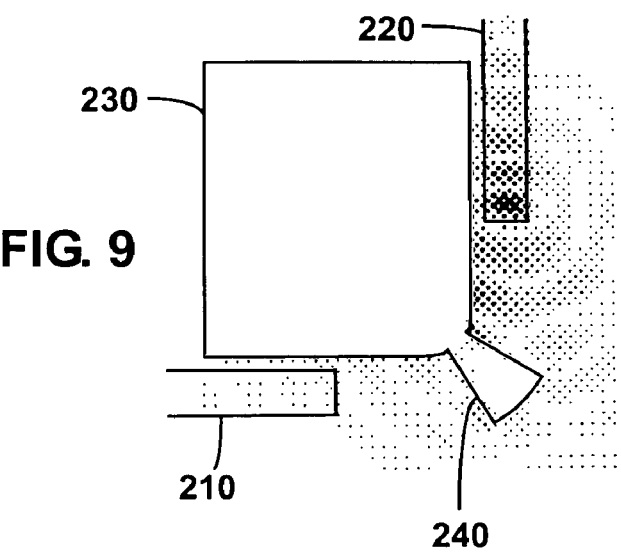
FIG. 9 shows a plasmon bend device with a defect coupling dielectric waveguides.
Figure 10:
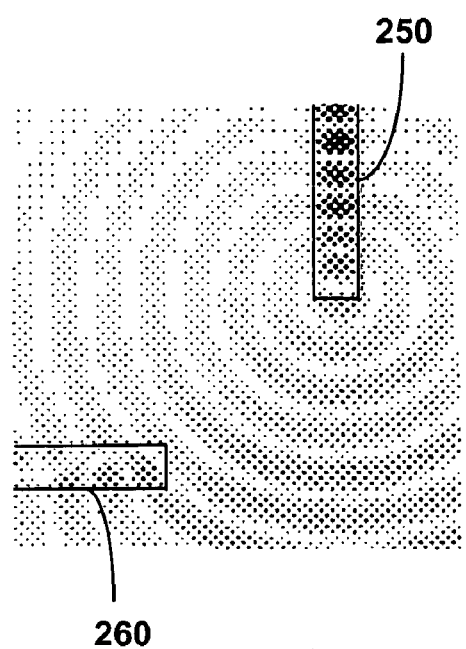
FIG. 10 shows dielectric waveguides without a coupling device.

FIG. 8 shows an example of a bend waveguide coupling (for example 90 degrees). In particular, FIG. 8 shows a plasmon bend device 200 coupling dielectric waveguides 210 and 220. FIG. 9 shows a plasmon bend device 230 with a defect 240 added. FIG. 10 shows dielectric waveguides 250, 260 without a coupling metal layer. FIGS. 8-10 are renderings of the FDTD simulations, also showing the out-of-plane H field.

Figure 11:
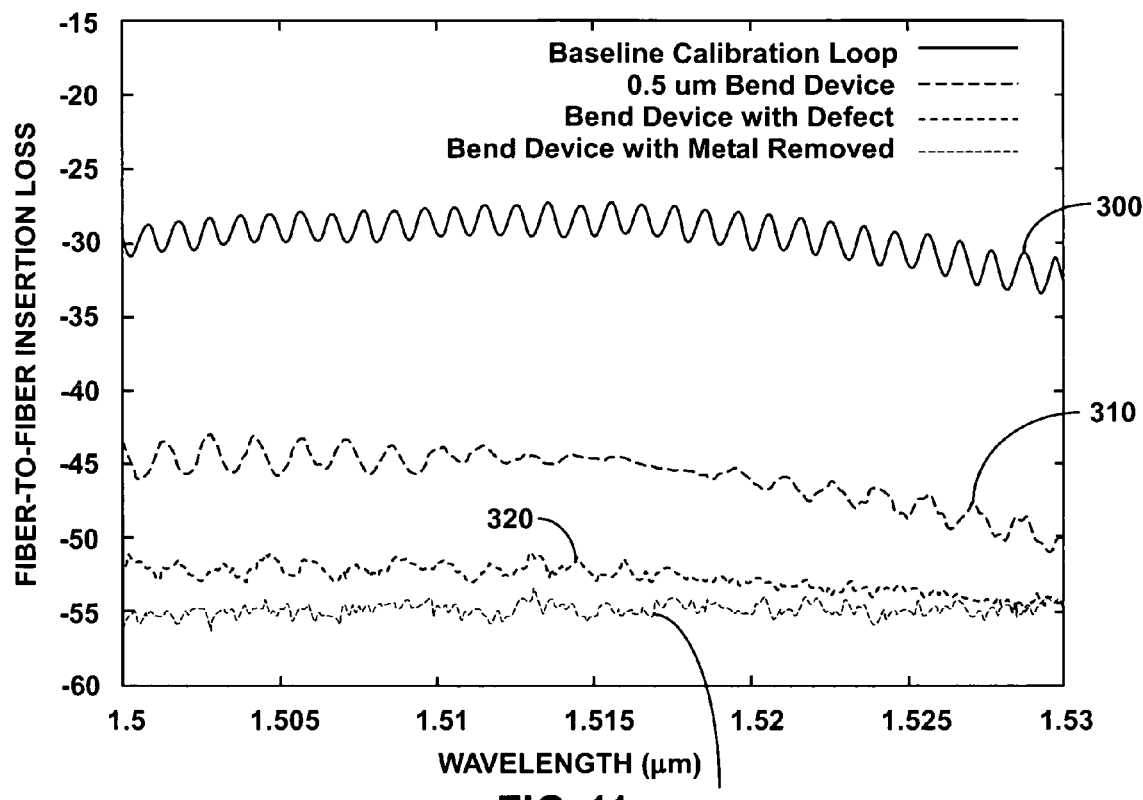
FIG. 11 shows data measured from devices fabricated in accordance with FIGS. 8-10.

FIG. 11 shows the measured data from fabricated devices, showing the transmission spectra of the best measured devices of each type, with fiber to fiber insertion loss in dB plotted against laser wavelength in μm. The baseline calibration loop spectrum is also shown for comparison. In particular, spectrum 300 refers to a dielectric waveguide, which is used as a calibration structure to see the wavelength dependence of the couplers. Spectrum 310 refers to a device with a plasmon waveguide bend device. Spectrum 320 refers to a bend device with a metal defect added. Spectrum 330 refers to a bend device with no metal at all. Comparison between spectrum 310 and spectra 320, 330 shows a better behavior when a correct plasmon waveguide is present.

The applicants have chosen the best device measurements, selected from about 25 devices of each type. The raw data measured are shown, as well as the test setup baseline curve, which is the fiber to fiber insertion loss for a simple SOI waveguide calibration loop. The ripple observed in the spectra is due to return losses on chip and on our input couplers forming cavities. FDTD simulations predict that the 0.5 μm bend device should have 11 dB of insertion loss in the 1.5-1.53 μm range, while the defect introduces 16 dB of loss for the entire bend. Perhaps more importantly, a complete absence of a metal layer induces an insertion loss of 25 dB. The measured device performance is in approximate agreement with these values, when the testing noise floor of −55 dB is taken into account. Note that the nearly 15 dB extinction observed in the bend calibration device is closer to the simulated value of 11 dB, since the propagation loss of the plasmon waveguide is about 0.9 dB/μm above the simulated value, most likely due to edge roughness.

Figure 12:
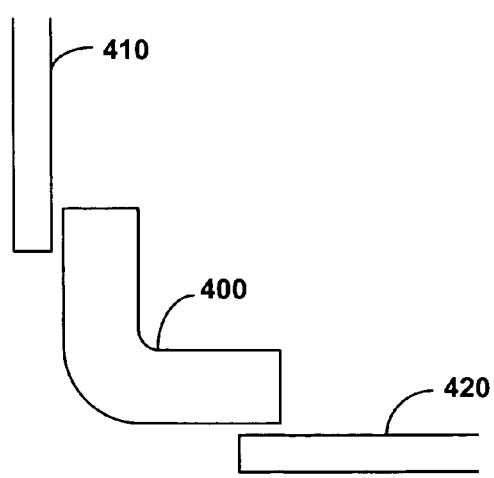
FIG. 12 shows a further example of a curved plasmon waveguide coupling dielectric waveguides.

FIG. 12 shows a further example of a curved plasmon waveguide 400 coupling dielectric waveguides 410, 420. It should be noted that the plamon waveguide adopted in accordance with the present disclosure can also have a functionalized surface, i.e. a surface where a coating has been applied, the coating exhibiting changes in its properties. The changes in the properties of the coating can depend on the environment surrounding the coating, so that the waveguide can be used as a sensor for environmental changes. For example, the coating can be made of biomolecules which change their shape, thus changing their index of refraction or oprical loss characteristic when exposed to a different molecule or class of molecules.

Reference is also made to the paper "Integrated Plasmon and Dielectric Waveguides" by Michael Hochberg, Tom Baehr-Jones, Chris Walker and Axel Scherer, Opt. Express 12, 5481-5486 (November 2004) which is incorporated herein by reference in its entirety.

To summarize, a viable material platform for the construction of integrated dielectric-plasmon circuits has been herein disclosed. The planar process according to the present disclosure can uses SOI wafers that are commercially available. When the plasmon-dielectric coupling efficiencies of 2.4 dB if the present disclosure are combined with the fiber to dielectric insertion losses of 7.7 dB achieved in similar waveguiding geometries (like the one disclosed in the Q-ring resonators paper mentioned above), a technological path is provided for the coupling of radiation from an optical fiber to a nano-scale plasmon waveguide with low insertion loss.

While several illustrative embodiments of the invention have been shown and described, numerous variations and alternative embodiments will occur to those skilled in the art. Such variations and alternative embodiments are contemplated, and can be made without departing from the scope of the invention as defined in the appended claims.

What is claimed is:

1. An optical circuit comprising:
   a metal waveguide; and
   a dielectric waveguide coupled to the metal waveguide,
      wherein light from the dielectric waveguide is adapted to be guided in a plasmon mode substantially external to the metal waveguide and confined substantially adjacent an edge of the metal waveguide.

2. The circuit of claim 1, wherein the dielectric waveguide is a silicon-on-insulator waveguide.

3. The circuit of claim 1, wherein the metal waveguide is comprised of a material selected from the group consisting of silver, platinum, gold and alloys thereof.

4. The circuit of claim 3, wherein the metal waveguide is made of a layer of silver having a thickness between about 50 nm and about 1000 nm.

5. The circuit of claim 1, wherein the metal waveguide is located on a dielectric layer.

6. The circuit of claim 5, wherein the dielectric layer is a silicon dioxide layer.

7. The circuit of claim 1, wherein the circuit is clad in polymethylmethacrylate (PMMA).

8. The circuit of claim 1, wherein the circuit is clad in silicon dioxide.

9. The circuit of claim 1, wherein the circuit is clad in air.

10. The circuit of claim 1, wherein the metal waveguide has a functionalized surface.

11. The circuit of claim 1, wherein the metal waveguide is coupled to the dielectric waveguide by way of directional coupling or butt coupling.

12. The circuit of claim 1, wherein the metal waveguide is a straight metal waveguide.

13. The circuit of claim 12, wherein the straight metal waveguide has a plasmon propagation length ranging from 1 to 1000 microns.

14. The circuit of claim 1, wherein the metal waveguide is a curved waveguide, thus defining a curved edge.

15. The circuit of claim 14, wherein the curved metal waveguide has a bend radius of less than 10 microns.

16. An optical coupling arrangement comprising:
   a first dielectric waveguide;
   a metal waveguide optically coupled to the first dielectric waveguide; and
   a second dielectric waveguide optically coupled to the metal waveguide, wherein light from the first dielectric waveguide to the second dielectric waveguide is adapted to be guided in a plasmon mode substantially external to the metal waveguide and confined substantially adjacent an edge of the metal waveguide.

17. The arrangement of claim 16, wherein the first dielectric waveguide is aligned with the second dielectric waveguide.

18. The arrangement of claim 16, wherein the first dielectric waveguide is perpendicular to the second dielectric waveguide.

19. The arrangement of claim 16, wherein the metal waveguide is a straight waveguide.

20. The arrangement of claim 16, wherein the metal waveguide is a curved waveguide.

21. The arrangement of claim 16, wherein the first and second dielectric waveguides are silicon-on-insulator (SOI) waveguides.

22. A process of fabricating an optical circuit comprising:
   providing a metal waveguide;
   providing a dielectric waveguide; and
   coupling the metal waveguide with the dielectric waveguide, to allow light in the dielectric waveguide to be guided in a plasmon mode substantially external to the metal waveguide and confined substantially adjacent an edge of the metal waveguide.

23. The process of claim 22, further comprising:
   providing a cladding layer to clad the metal waveguide and the dielectric waveguide.

24. The process of claim 22, wherein the cladding layer is a polymethylmethacrylate (PMMA) layer.

25. The process of claim 24, wherein coupling between the metal waveguide and the dielectric waveguide is obtained by way of directional coupling or butt coupling.

* * * * *